United States Patent [19]

Ishino

[11] Patent Number: 4,751,743
[45] Date of Patent: Jun. 14, 1988

[54] OPTICAL CHARACTER READER

[75] Inventor: Hiroaki Ishino, Osaka, Japan

[73] Assignee: Sumitomo Electric Industries, Ltd., Osaka, Japan

[21] Appl. No.: 771,586

[22] Filed: Sep. 3, 1985

Related U.S. Application Data

[63] Continuation-in-part of Ser. No. 608,089, May 8, 1984, abandoned.

[51] Int. Cl.$^4$ .............................................. G06K 9/22
[52] U.S. Cl. ...................... 382/59; 358/285; 382/48
[58] Field of Search ............. 382/59, 63, 67, 22, 382/48, 20, 61; 358/285; 355/14 SH

[56] References Cited

U.S. PATENT DOCUMENTS

| | | | |
|---|---|---|---|
| 3,160,853 | 12/1964 | Howard | 382/48 |
| 3,274,550 | 9/1966 | Klein | 382/48 |
| 3,918,028 | 11/1975 | Humphrey et al. | 382/59 |
| 4,143,358 | 3/1979 | Neff | 382/59 |
| 4,356,473 | 10/1982 | Freudenthal | 382/63 |
| 4,571,055 | 2/1986 | Nishiyama | 355/14 SH |
| 4,630,127 | 12/1986 | Fuwa | 358/285 |

Primary Examiner—Leo H. Boudreau
Attorney, Agent, or Firm—Wenderoth, Lind & Ponack

[57] ABSTRACT

An optical character reader which digitizes analog electrical signals obtained by scanning through an image sensor characters or symbols entered on a sheet so that a discrimination circuit recognizes the characters or the like on the basis of the digital signals. The discrimination circuit is controlled by sheet detection signals for indicating that the image-formation picture of the image sensor is positioned so as to completely mate with the sheet, the characters or the like being read only when the image-formation picture is positioned so as to completely mate with the sheet. In order to detect that the image-formation picture is positioned so as to completely mate with the sheet a base having a reflection factor lower than that of the sheet is used for fixing the sheet so as to thereby utilize a difference between the reflection factors of the sheet and the base. Thus, when the image-formation picture is positioned even in part corresponding to the base, a form detection signal is adapted not provided whereby the discrimination circuit does not mistakenly read the edge of the sheet.

2 Claims, 2 Drawing Sheets

– continued –

OPTICAL CHARACTER READER

CROSS-REFERENCE TO RELATED APPLICATIONS

This application is a continuation-in-part of now abandoned application Ser. No. 608,089, filed May 8, 1984.

BACKGROUND OF THE INVENTION

This invention relates to an optical character reader for accurately reading characters or symbols printed on a sheet.

Generally, the optical character reader scans characters on a sheet, images the characters through a lens system on an image sensor comprising a photoelectric conversion element, converts analog signals from the image sensor into binary signals corresponding to the background region and the characters on the sheet, and discriminates the characters on the sheet by the use of a discrimination circuit. For reading the characters printed on the sheet such as slips or price tags, a hand-scan type optical character reader (to be hereinafter called the hand scan OCR) which hand-operates a scanning unit and a stationary type optical reader (to be hereinafter called the stationary OCR) which fixes the scanning unit and transports the sheet are used. These OCRs, as shown in FIG. 1, scans the objective characters 3 printed on a sheet 1, rightwardly or leftwardly in the direction of the arrow in the drawing to thereby carry out the reading operation.

When the characters 3 on the sheet 1 are read, however, a scanner 4 if often moved onto the character line from the base outside of the sheet 1 beyond the edge 2 of the sheet. Since the edges 2 at the sheet 1 are liable to be optically shaded, the shading often is read by mistake.

SUMMARY OF THE INVENTION

Accordingly, an object of the invention is to provide an optical character reader which prevents misreading of the edges of the form to thereby enable reliable reading of only the objective characters on the sheet.

The above and other objects and features of the invention will appear more fully hereinafter from a consideration of the following description taken in connection with the accompanying drawing wherein one example is illustrated by way of example.

DESCRIPTION OF THE PREFERRED EMBODIMENT

Figure 1:
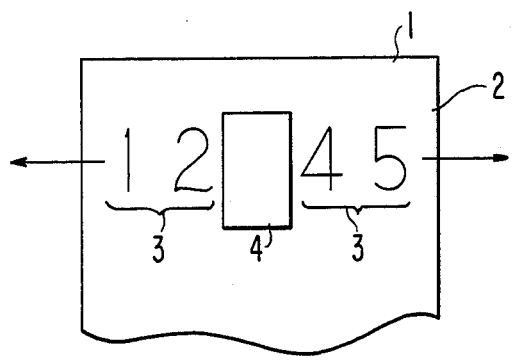
FIG. 1 is a plan view explanatory of read-scanning characters on a form.
Figure 2:
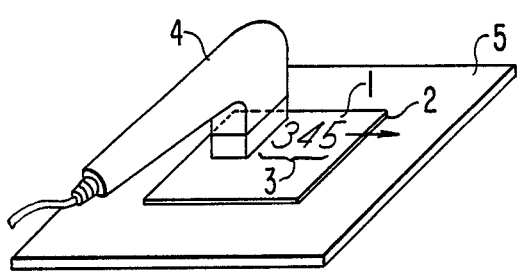
FIG. 2 is a schematic perspective view of an optical character reader in accordance with the present invention when read-scanning the characters.

Referring to FIG. 2, an embodiment of an optical character reader of the invention is shown, in which the surface of a base 5 on which a sheet 1 is to be placed is processed (for example. 2% or less) in comparison with a reflection factor (usually 70% or more) of the sheet 1.

Figures 3A, 3C:
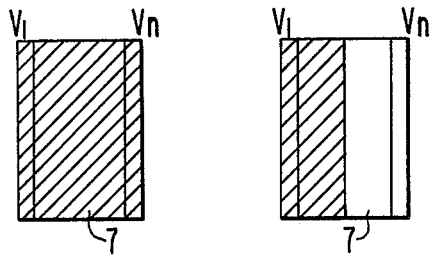
FIGS. 3(a), (b), (c) and (d) are plan views of pictures of an image sensor.

Also, a scanner 4 contains therein an image scanner (photoelectric conversion element) for converting a picture 6 imaged through a lens system into analog electric signals corresponding to brightness and shading of the light, the image sensor being utilized to provide a circuit for detecting the sheet 1. In addition, image-formation pictures of the image sensor are shown in FIGS. 3(a), (b), (c) and (d), a sheet detection circuit in FIG. 8, and waveforms at the respective units of the sheet detection circuit in FIG. 4(a) through FIG. 7(d).

Figures 3B, 3D:
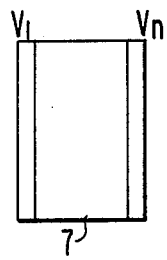

The image sensor converts the brightness and shading of the light into the intensity of voltage so that in FIG. 3(d), the image 6 at a picture 7 is so applied with a low voltage and other portions are so applied with a high voltage output form the image sensor.

Figure 8:
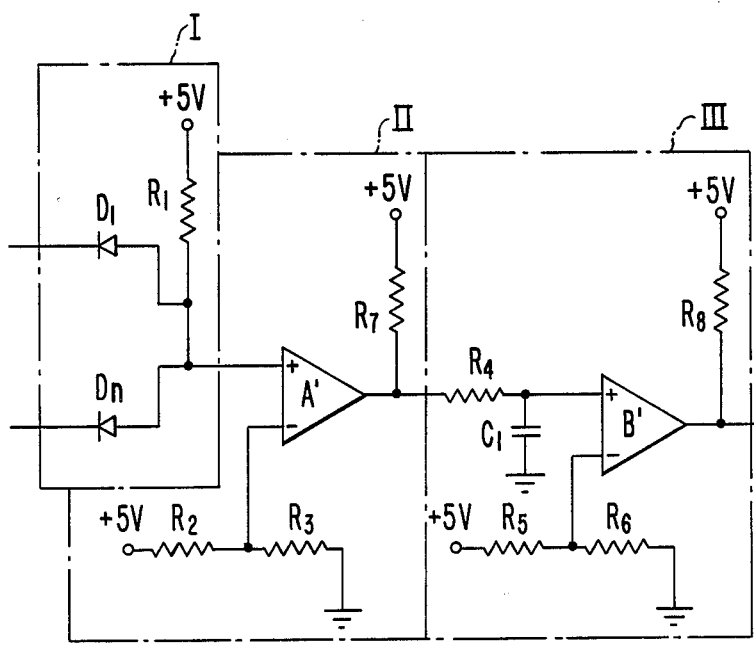
FIG. 8 is a circuit diagram for detecting a form.

The detection circuit for the sheet, as shown in FIG. 8, comprises circuit I, a comparison circuit II and an integration comparison circuit III.

The circuit I comprises diodes D1 and Dn and a resistor R1, the diodes D1 and Dn being connected to both lateral end lines V1 and Vn of the picture 7 of image sensor respectively.

Figure 4A:
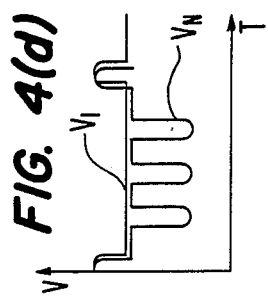
FIGS. 4(a), (b), (c) and (d) are voltage waveforms of the image sensor lines V1 through Vn.
Figure 4B:
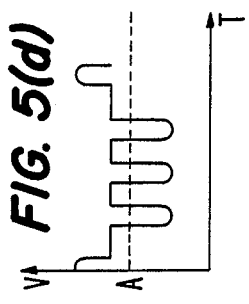
Figure 4C:
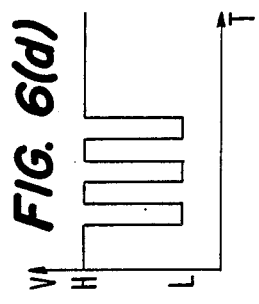
Figure 4D:
Figure 5A:
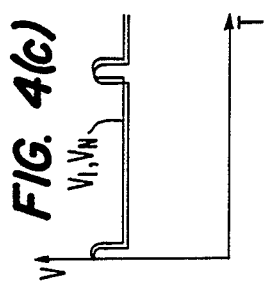
FIGS. 5(a), (b), (c) and (d) are voltage waveforms of the output from a circuit I.
Figure 5B:
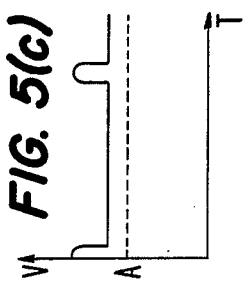
Figure 5C:
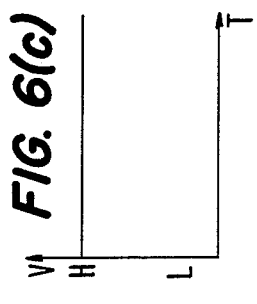
Figure 5D:
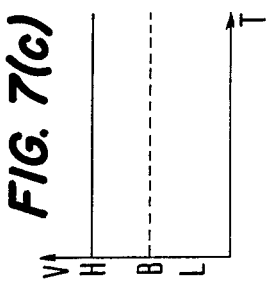

When the scanner 4 is positioned on, for example, the base 5 in FIG. 2, the picture of image sensor becomes dark as a whole as shown in FIG. 3(a), voltages at the lines V1 and Vn at this time being shown in FIG. 4(a). Hence, the output of circuit 1 becomes low voltage at each line V1 or Vn as shown in FIG. 5(a). Similarly, when the scanner 4 scans the edge of sheet 1, the sheet 1 and the characters 3, the picture, voltage on the lines V1 and Vn, and the output of the circuit 1, are shown in FIGS. 3(b), (c) and (d). FIGS. 4(b), (c) and (d), and FIGS. 5(b), (c) and (d) respectively.

The comparison circuit II comprises a comparator A1 and resistors R2, R3 and R7. The output of OR circuit I is connected to the plus input terminal of the comparator A1, and to the minus terminal thereof is connected the reference voltage A (shown by the broken lines in FIGS. 5(a), (b), (c) and (d) at the midpoint between the voltage output from the OR circuit I when the scanner 4 is positioned on the sheet 1 and the voltage output from the OR circuit I when the scanner 4 is positioned on the base 5, the reference voltage A being set by dividing the voltage +5 V by the resistors R2 and R3.

The comparison circuit II compares the reference voltage A with the output of OR circuit I and when voltage of the latter is highter than that of the former, a voltage H is output, and when the reverse is true, a voltage L is output. When the scanner 4 is positioned on the base 5, edge of sheet 1, sheet 1 or characters 3, the output of the comparison circuit II is as shown in FIG. 6(a), (b), (c) or (d).

The integration comparison circuit III comprises a comparator B1, resistors R4, R5, R6 and R8 and a capacitor C1. The output of comparison circuit II is connected to the plus input terminal of the comparator B through an integration circuit comprising the resistor R4 and capacitor C1, and to the minus terminal of the comparator B1 is connected the reference voltage B (shown by the broken lines in FIGS. 7(a), (b), (c) and (d) at the midpoint between the voltage developed by the integration circuit when the scanner 4 is positioned on the sheet and that developed by the integration circuit when the scanner 4 is positioned on the base 5, the reference voltage B being set by dividing the voltage +5 V by the resistors R5 and R6.

Figure 6A:
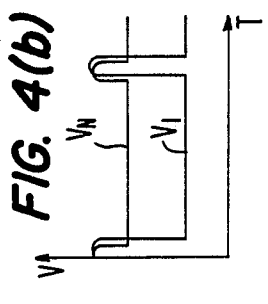
FIGS. 6(a), (b), (c) and (d) are waveforms of the output from a comparator circuit II.
Figure 6B:
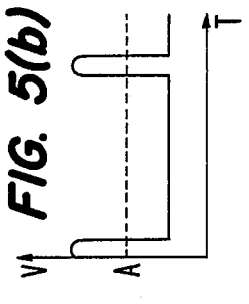
Figure 6C:
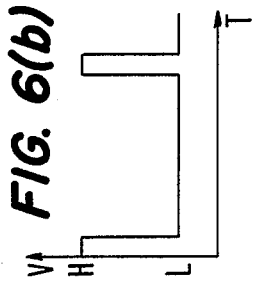
Figure 6D:
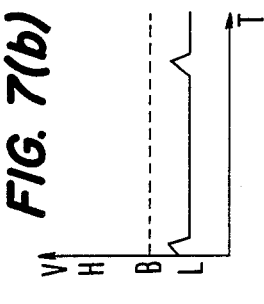
Figure 7A:
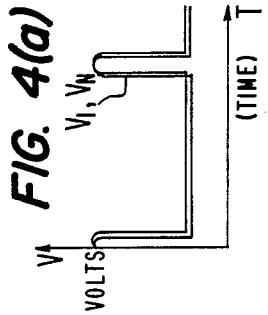
FIGS. 7(a), (b), (c) and (d) are voltage waveforms of the input to a comparator B in an integration comparison circuit III.
Figure 7B:
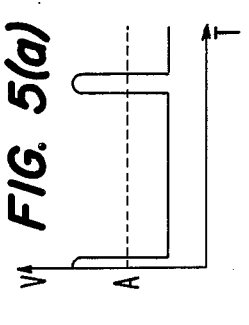
Figure 7C:
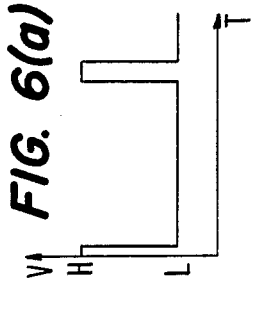
Figure 7D:
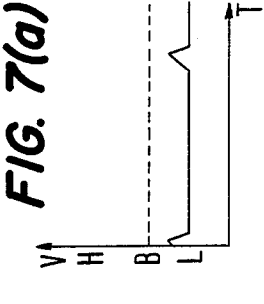

The integration circuit is used for integrating the respective outputs of the comparison circuit II to produce a voltage difference from the reference voltage B as shown in FIGS. 7(a), (b), (c) and (d) because the outputs of comparison circuit II are in pulses as shown in FIG. 6(a), (b), and (d) so that it cannot be determined whether the scanner 4 is positioned on the base 5 and the edge of form 1, or on the characters 3. Hence, the integration comparison circuit III outputs the sheet detection signal a of a voltage L when the scanner 4 is positioned on the base 5 and the edge of sheet 1 and the comparison circuit III outputs a signal a of a voltage H when the scanner 4 is positioned on the sheet 1 and characters 3. Hence, this invention is advantageous in that when the sheet detection signal is of a voltage H, the discrimination circuit carries out discrimination of characters 3, thereby eliminating the reading of the edge of sheet 1 by mistake.

While a preferred embodiment of the invention has been described using specific elements, such a description is for illustrative purposes only, and it is to be understood that changes and variations may be made without departing from the spirit or scope of the following claims.

What is claimed is:

1. An optical character reader provided with an image sensor which scans characters or the like printed on a sheet and outputs analog electrical signals corresponding to said characters or the like, a binary circuit for converting said analog electrical signals into binary signals corresponding to a character region and a background region, and a discrimination circuit for recognizing said characters or the like on the basis of said binary signals, said optical character reader having a circuit which comprises: a detecting circuit for detecting the lower of two voltages obtained from two of a plurality of specified lines in an image-information picture at said image sensor; a comparison circuit which compares a voltage of said signals obtained by said detecting circuit with a first preset reference voltage value so as to determine whether said voltage of said detecting circuit is high or lower than said reference voltage and which outputs a signal corresponding thereto, and an integrating comparison circuit which compares the result of integrating said singnal output by said comparison circuit with a second preset refernece voltage so as to determine whether said signal output by said comparison circuit is higher or lower than said second preset reference voltage so as to determine if said image-information picture at said image sensor is positioned completely on the sheet; and if said image-information picture is positioned completely on the sheet, so as to output a sheet detecting signal.

2. An optical character reader as set forth in claim 1, wherein both lateral end lines at said image sensor are used as said two input lines to said detecting circuit.

* * * * *